US000001116H

United States Statutory Invention Registration [19]

[11] Reg. Number: H1116

Love, Jr.

[43] Published: Dec. 1, 1992

[54] METHOD FOR INTRODUCING REELED TUBING INTO OIL AND GAS WELLS

[75] Inventor: Billy C. Love, Jr., Corpus Christi, Tex.

[73] Assignee: Otis Engineering Corporation, Dallas, Tex.

[21] Appl. No.: 700,496

[22] Filed: May 15, 1991

[51] Int. Cl.[5] ..... E21B 19/00

[52] U.S. Cl. ..... 166/384; 166/242; 166/312; 166/380

[58] Field of Search ..... 166/378, 98, 380, 65.1, 166/387, 312, 351, 242

[56] References Cited

U.S. PATENT DOCUMENTS

| | | | |
|---|---|---|---|
| 4,629,218 | 12/1986 | Dubois | 166/242 X |
| 4,714,117 | 12/1987 | Dech | 166/380 |
| 4,744,420 | 5/1988 | Patterson et al. | 166/312 |
| 4,928,759 | 5/1990 | Siegfried, II et al. | 166/65.1 |
| 4,936,387 | 6/1990 | Rubbo | 166/387 |
| 4,949,791 | 8/1990 | Hopmann et al. | 166/378 |
| 5,002,130 | 3/1991 | Laky | 166/351 |
| 5,040,598 | 8/1991 | Pleasants | 166/98 |

FOREIGN PATENT DOCUMENTS 0377234 10/1989 European Pat. Off. .

*Primary Examiner*—David H. Brown

[57] ABSTRACT

A method for introducing reeled tubing into oil and gas wells, in which a relatively stiff pipe segment is connected to the leading end of the reeled tubing before the reeled tubing is introduced into the well. The reeled tubing, with the pipe segment attached to its leading end, is unwound from its reel and the pipe segment reduces damage to the wall of the well and jamming of the reeled tubing in the well as the tubing passes through the well.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

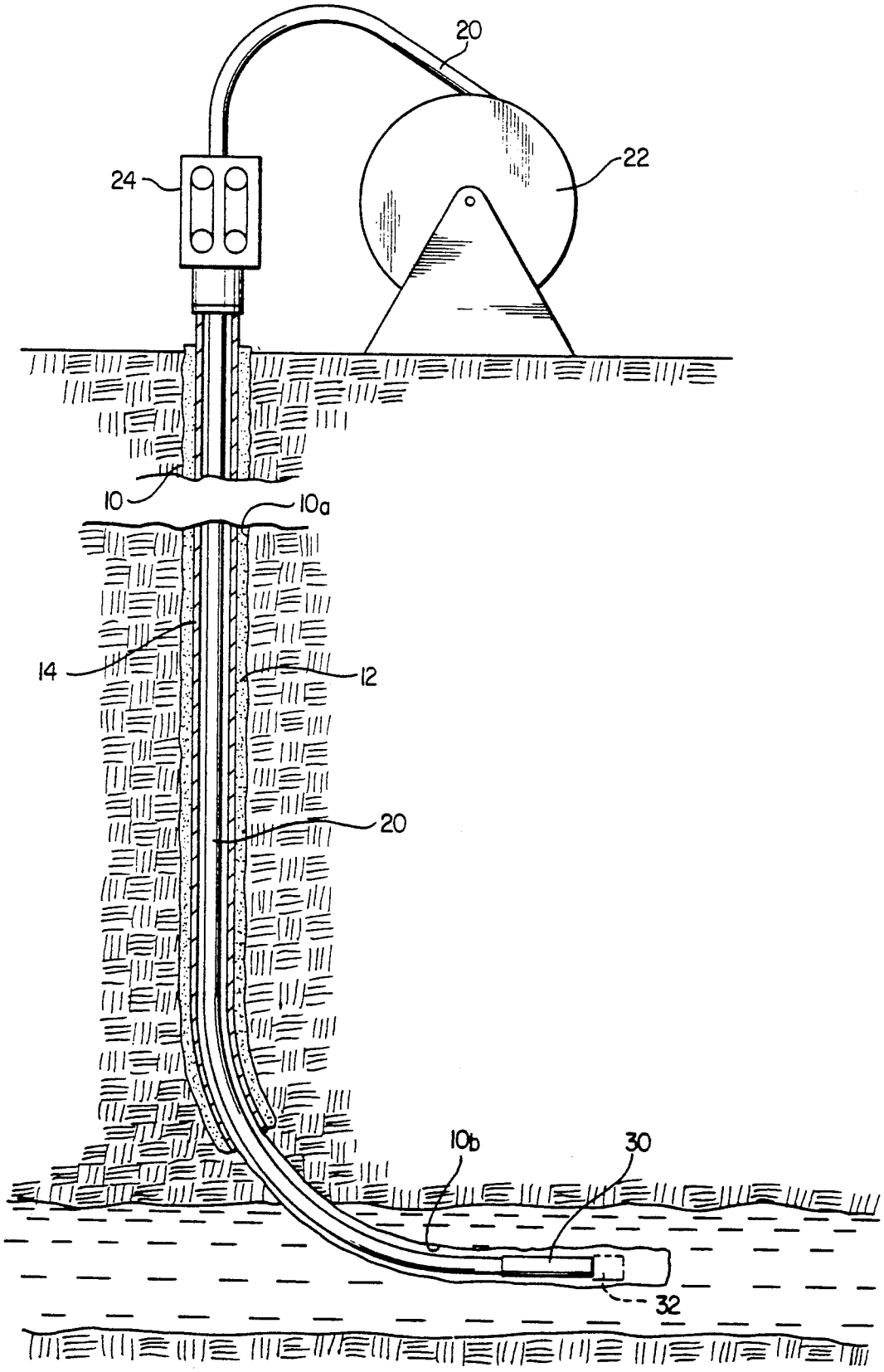
20
22
24
10
10a
14
12
20
10b
30
32

METHOD FOR INTRODUCING REELED TUBING INTO OIL AND GAS WELLS

BACKGROUND OF THE INVENTION

The present invention relates to a method for introducing reeled tubing into oil and gas earth wells and, more particularly, to such a method which reduces damage to the wells and prevents jamming of the reeled tubing in the wells.

In the operation of subterranean oil and gas earth wells, relatively small-diameter, thin-walled, continuous-length reeled, or coiled, tubing is now being used in certain applications in place of wireline or the like, since reeled tubing has several advantages. For example, reeled tubing does not rely on gravity for setting and retrieving the operating tools can thus can traverse highly deviated, or horizontal, earth wells. Also, reeled tubing can be more rapidly inserted into the well and can be more easily passed through downhole equipment. Also, fluids such as water, foam, paraffin, corrosion inhibitors, spotting acid, cement, and the like, can be conveyed by the reeled tubing to the well for performing various functions including washing and cleaning. Further, when used with operating tools the reeled tubing can be used to convey fluids to the operating tool to hydraulically actuate the tool.

Reeled tubing is usually made from soft-sheet steel which is rolled and induction welded along its length before being spooled onto a deployment reel. The tubing is then heat-treated on the reel to stress-relieve the tubing wall and the seam weld. Several sections of tubing are then butt-welded together to achieve lengths of up to several thousand feet for reaching the treatment zone in the well.

In the deployment of reeled tubing, the tubing is unreeled from the reel, typically at or near ground level and usually passed over a goose-neck and into an injector head located axially above the wellhead and the wellbore. The injector head typically comprises a dual chain-driven mechanism which drives the reeled tubing into, and pulls the tubing from, the well.

During this process, torsional forces are applied to the tubing as it is wound on, and unwound from the reel and passed upwardly to the goose-neck. Also, the tubing is plastically deformed as it is drawn from the reel and passed over the goose-neck and into the injector head. Further, tensil forces are applied to the tubing due to the pulling force of the injector head drive mechanism and a braking or rewind force applied at the reel. Also, the tubing leaving the injector head and going into the well is disposed in the well in a long helix which causes the tubing and especially the end thereof, to engage the walls of the well which often causes damage to casing well tubing, or the like, disposed in the well.

This problem is compounded since, once the zone of treatment has been reached by the end of the reeled tubing, typical operations may require cycling of the reeled tubing upwardly and downwardly over an interval up of hundreds of feet causing bending and unbending of portions of the reeled tubing located at or near the surface as the tubing passes and re-passes the injector head, the goose-neck and the reel. Finally, in removing the reeled tubing from the well, the entire length of the deployed tubing is again subjected to all of the above forces and plastic bending in reverse order as it is wound back onto its reel, further increasing the changes of damage to the casing and/or well tubing. Also as a result of all of the foregoing, the end portion of the reeled tends to lodge, or jam, in the well, especially in wells having a horizontal portion.

SUMMARY OF THE INVENTION

It is therefore an object of the present invention to provide a method for introducing reeled tubing into an oil and gas earth well.

It is a further object of the present invention to provide a method of the above type which reduces damage to the casing or well tubing in the well.

It is a further object of the present invention to provide a method of the above type which reduces the tendency of the end portion of the reeled tubing to jam in the well.

Toward the fulfillment of these and other objects, according to the method of the present invention, a relatively stiff pipe segment is connected to the leading end of the reeled tubing before the reeled tubing is introduced into the well. The reeled tubing, with the pipe segment attached to its leading end, is unwound from its reel and the pipe segment functions to reduce damage to the casing or well tubing in the well and jamming of the reeled tubing in the well.

DESCRIPTION OF THE DRAWING

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing which is a schematic view, partially in elevation and section, and partially broken away, of a deviated oil and gas earth well, showing reeled tubing after it has been introduced into the well according to the method of the present invention.

DESCRIPTION OF THE PREFERRED EMBODIMENT

Referring to the drawing, the reference numeral 10 refers to a deviated oil and gas earth well extending below ground and having a generally vertical section 10*a* and a generally horizontal section 10*b*. An outer casing 12, of a cementaceous material is formed against the wall of the well and extends from ground surface to approximately the lower end of the vertical section 10*a* of the well. An inner casing, or tubing 14, extends within the casing 12 in the vertical well section 10*a*.

A section of reeled tubing 20 is stored on a reel 22 above ground and is injected into the inner casing 14 by an injector 24. The reeled tubing 20 is formed in the manner discussed above by a plurality of sections connected at their respective ends which, according to a preferred embodiment, are thirty feet in length, and the wall thickness of the reeled tubing is such that it is flexible enough to be wound on the reel 22.

It is understood that a goose-neck (not shown) can be provided on the injector 24 and a manifold (not shown) can be provided which includes the necessary pumps, valves, and fluid reservoirs to discharge a fluid into and through the reeled tubing 20. It is also understood that a wellhead valve (not shown) is used to control vertical access to, and fluid communication with, the upper portion of the inner casing 14, and blowout preventers, or the like (not shown), can be installed to block fluid flow during emergency conditions. Since these components are conventional they will not be described in any further detail.

The reeled tubing 20 is shown extending through the vertical section 10*a* of the well 10, through an angled or curved section and into the horizontal section 10*b*, and is installed according to the method of the present invention. More particularly, before any of the reeled tubing 20 is introduced into the casing 14, a rigid section of pipe 30 is connected to the free, or distal, end of the reeled tubing. The connection is made in any conventional manner, such as by forming cooperating internal and external threads on the corresponding end portions of the reeled tubing 20 and the pipe 30. The length of the pipe 30 is less than that of each of the sections forming the reeled tubing and according to a preferred embodiment is six feet. The diameter of the pipe 30 is substantially the same, or slightly greater (as shown) than the diameter of the reeled tubing 20 and the thickness of the pipe, or the material forming the pipe, is such that it is stiffer, or more rigid, than the reeled tubing.

The pipe 30, with the end of the reeled tubing 20 connected to its trailing end, is introduced into the upper portion of the casing 14, and the reeled tubing is played out from the reel 22 to force the pipe 30 and the tubing into and through the casing 14. The pipe 30 and the reeled tubing 20 pass through the casing 14 in the vertical section 10*a* of the well and then into the uncased, substantially horizontal well section 10*b* before taking the position shown in the drawing. During the introduction of the pipe 30 and the reeled tubing 20 into the well 10, the relatively short and rigid pipe 30 increases the structural integrity of the tubing 20 and "guides" the tubing through the well while minimizing the tendency of the end portion of the reeled tubing to engage the wall of the casing 14, and/or become stuck or jammed which otherwise would occur due to the helical shape that the reeled tubing takes as it traverses the well, and due to the plastic bending of, and the forces on, the tubing as discussed above.

According to a preferred embodiment, the pipe 30 can be in the form of a "pup joint" manufactured, for example, by the Tube-Alloy Corporation of Houston, Tex. which is available in lengths from two feet to ten feet. In addition to being shorter in length than the individual sections of the reeled tubing 20, the pipe section 30 is more rigid than the tubing, which rigidity can be achieved by manufacturing the pipe section of a thicker wall and/or of a more rigid material.

Washing or cleaning fluid can be introduced from the manifold described above into the reeled tubing 20 during its introduction into the well 10 and/or after it attains the position shown in the drawing. In either case the fluid would pass through the pipe 30 and discharge from its free end to perform the washing or cleaning operation.

It is understood that an operating tool, such as shown by the reference number 32, can be attached to the free end of the pipe 30 without departing from the scope of the invention, as long as the tool does not interfere with the function of the pipe 30, as described above.

It should be emphasized that variations in some of the parameters set forth above can be made without departing from the scope of the invention. For example, the diameter and length of the pipe 30 can vary from the examples described above.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of installing relatively flexible tubing wound on a reel into an earth well, comprising the steps of attaching a relatively stiff pipe onto the leading end of said tubing, then inserting said pipe and said attached tubing into said earth well, and then unwinding said tubing from said reel to force said pipe and said tubing through said well, said pipe reducing the tendency of said tubing to engage the well of said well and/or become jammed in said well.

2. The method of claim 1 further comprising the step of introducing fluid into said tubing for discharge from said pipe into said well.

3. The method of claim 1 wherein said tubing is formed by a plurality of tubular sections connected together at their respective ends, and wherein the length of said pipe is less than the length of each of said tubular sections.

4. The method of claim 1 wherein said pipe is in the form of a pup joint.

5. The method of claim 1 further comprising the step of attaching a tool to said pipe after said first step of attaching and before said step of inserting.

6. The method of claim 1 wherein said earth well has a generally vertical-extending section and a generally horizontal-extending section.

7. A method of operating as earth well, including the steps of winding relatively flexible, continuous length tubing on a reel, then inserting said tubing into said earth well, and then unwinding said tubing from said reel to force said tubing through said well, said steps of winding and unwinding creating torsional forces and plastic bending that forces the tubing against the wall of the well wherein the improvement comprises the step of attaching a relatively stiff pipe onto the leading end of said tubing before said step of inserting to guide said tubing through said well to reduce the effect of said forces and said bending.

8. The method of claim 7 further comprising the step of introducing fluid into said tubing for discharge from said pipe into said well.

9. The method of claim 7 wherein said tubing is formed by a plurality of tubular sections connected together at their respective ends, and wherein the length of said pipe is less than the length of each of said tubular sections.

10. The method of claim 7 wherein said pipe is in the form of a pup joint.

11. The method of claim 7 further comprising the step of attaching a tool to said pipe after said first step of attaching and before said step of inserting.

12. The method of claim 7 wherein said earth well has a generally vertical-extending section and a generally horizontal-extending section.

* * * * *